United States Patent
Yu (10) Patent No.: US 7,295,607 B2
(45) Date of Patent: Nov. 13, 2007

(54) METHOD AND SYSTEM FOR RECEIVING PULSE WIDTH KEYED SIGNALS

(75) Inventor: Tommy Yu, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 696 days.

(21) Appl. No.: 10/856,936

(22) Filed: Jun. 1, 2004

(65) Prior Publication Data

US 2005/0249276 A1    Nov. 10, 2005

Related U.S. Application Data

(60) Provisional application No. 60/568,856, filed on May 7, 2004.

(51) Int. Cl.
*H03K 7/08* (2006.01)
(52) U.S. Cl. ..................... 375/238; 329/312
(58) Field of Classification Search ........... 375/238, 375/316; 329/312; 332/109; 327/26, 31, 327/36; 341/53; 370/205, 212; 348/471
See application file for complete search history.

(56) References Cited

U.S. PATENT DOCUMENTS

| 6,066,970 A | * | 5/2000 | Kawai ........................ 327/165 |
| 6,704,369 B1 | * | 3/2004 | Kawasaki et al. .......... 375/285 |
| 7,110,473 B2 | * | 9/2006 | Miller et al. ................ 375/316 |

* cited by examiner

*Primary Examiner*—Don N. Vo
(74) *Attorney, Agent, or Firm*—Sterne, Kessler, Goldstein & Fox PLLC (57) ABSTRACT

Provided is a method to process a pulse width coded signal. the method includes digitizing a received pulse width coded signal and transforming the digitized signal to at least one of power domain and absolute value domain. The converting produces a converted signal. The method also includes estimating a signal power of the converted signal in a wide band filter to produce data representative of a first signal having first type signal shape properties and estimating a signal power of the converted signal in a narrow band filter to produce data representative of a second signal having second type signal shape properties. Finally, the first and second type data are compared to produce information representative of pulse width characteristics of the received signal.

17 Claims, 6 Drawing Sheets

METHOD AND SYSTEM FOR RECEIVING PULSE WIDTH KEYED SIGNALS

CROSS-REFERENCE TO RELATED APPLICATIONS

This application is a continuation of U.S. Provisional Application entitled "Method and System for Receiving Pulse Width Keyed Signals," Ser. No. 60/568,856, filed May 7, 2004, which is incorporated herein in its entirety by reference.

BACKGROUND OF THE INVENTION

1. Field of the Invention

The present invention relates to the field pulse width keying. In particular, the present invention relate to the field of determining pulse related characteristics of pulse width keyed signals.

2. Related Art

Pulse width keying uses the length of a pulse over a time period for bit representation. In some modulation schemes, for example, a bit "0" is represented as a 1.0 millisecond (ms) pulse followed by 0.5 ms blanking time. In these schemes, a bit "1" might be represented as a 0.5 ms pulse followed by 1.0 ms blanking time.

In practice, pulse width keyed signals are used in a variety of applications. Included in these applications is the field of modern radar and radar receivers. Radars use pulse width keyed signals, for example, to determine target range, speed, and angle data. Radar receivers, such as radar warning receivers used in military applications, can discriminate between different radars, and different types of radars, on the basis of the pulse related characteristics of their respective pulse keyed signals.

A major shortcoming of using pulse width keyed signals, however, is the ability of the receiving system to accurately measure pulse data in noisy environments. Many conventional receiving systems, for example, rely purely upon envelope and amplitude threshold detection techniques to measure characteristics, such as pulse widths. In noisy environments, however, it becomes difficult to distinguish actual pulse related data from noise, using the conventional threshold detection techniques.

What is needed, therefore, is a more robust technique to detect and measure pulse related characteristics, such as pulse widths, associated with pulse width keyed signals.

BRIEF SUMMARY OF THE INVENTION

Consistent with the principles of the present invention as embodied and broadly described herein, a method to process a pulse width keyed signal includes digitizing a received pulse width keyed signal and transforming the digitized signal to at least one of power domain and absolute value domain. The converting produces a converted signal. The method also includes estimating a signal power of the converted signal in a wide band filter to produce data representative of a first signal having first type signal shape properties and estimating a signal power of the converted signal in a narrow band filter to produce data representative of a second signal having second type signal shape properties. Finally, the first and second type data are compared to produce information representative of pulse related characteristics of the received signal.

Further embodiments, features, and advantages of the present invention, as well as the structure and operation of the various embodiments of the present invention are described in detail below with reference to the accompanying drawings.

BRIEF DESCRIPTION OF THE DRAWINGS/FIGURES

The accompanying drawings, which are incorporated in and constitute part of the specification, illustrate embodiments of the present invention and, together with the general description given above and the detailed description of the embodiments given below, serve to explain the principles of the invention. In the drawings.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1A:
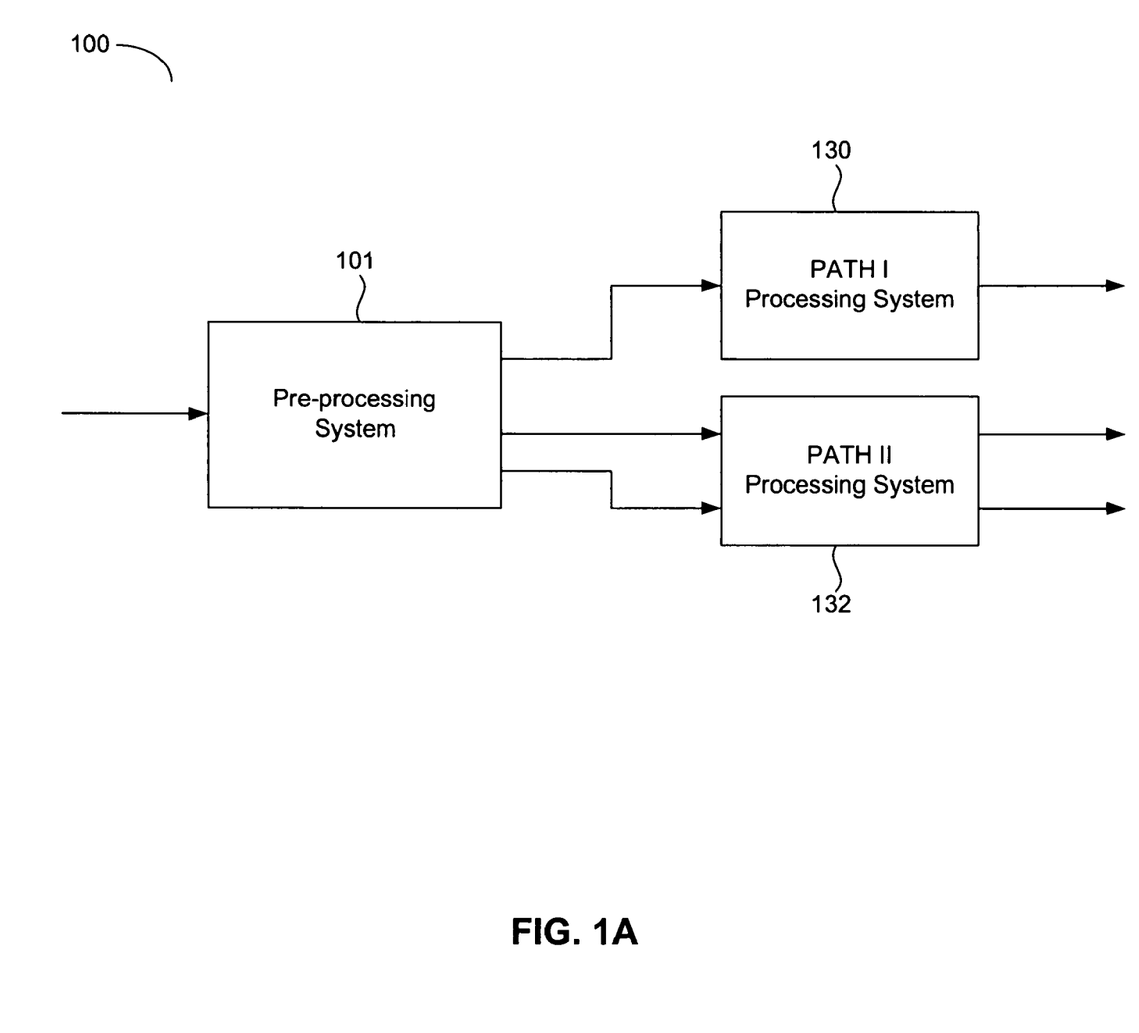
FIG. 1A is a block diagram of a receiving system constructed in accordance with an embodiment of the present invention.

FIG. 1A is a block diagram of a receiving system 100 constructed in accordance with an embodiment of the present invention. The receiving system 100 is a new receiver architecture that uses power detection for robust pulse width measurements in the presence of noise. Two different implementations of the architecture are provided and can be used in combination to further enhance the performance of the receiving system 100.

In FIG. 1A, the receiving system 100 includes a pre-processing system 101 configured to produce a number of waveform data signals as an output. One of the waveform data signals is provided as an input is provided as an input to a path I processing system 130 (discussed in greater detail below) where pulse related measurements are performed. Other waveform data signals are provided to a path II processing system 132 (also discussed in greater detail below), where separate pulse related measurements are performed.

Figure 1B:
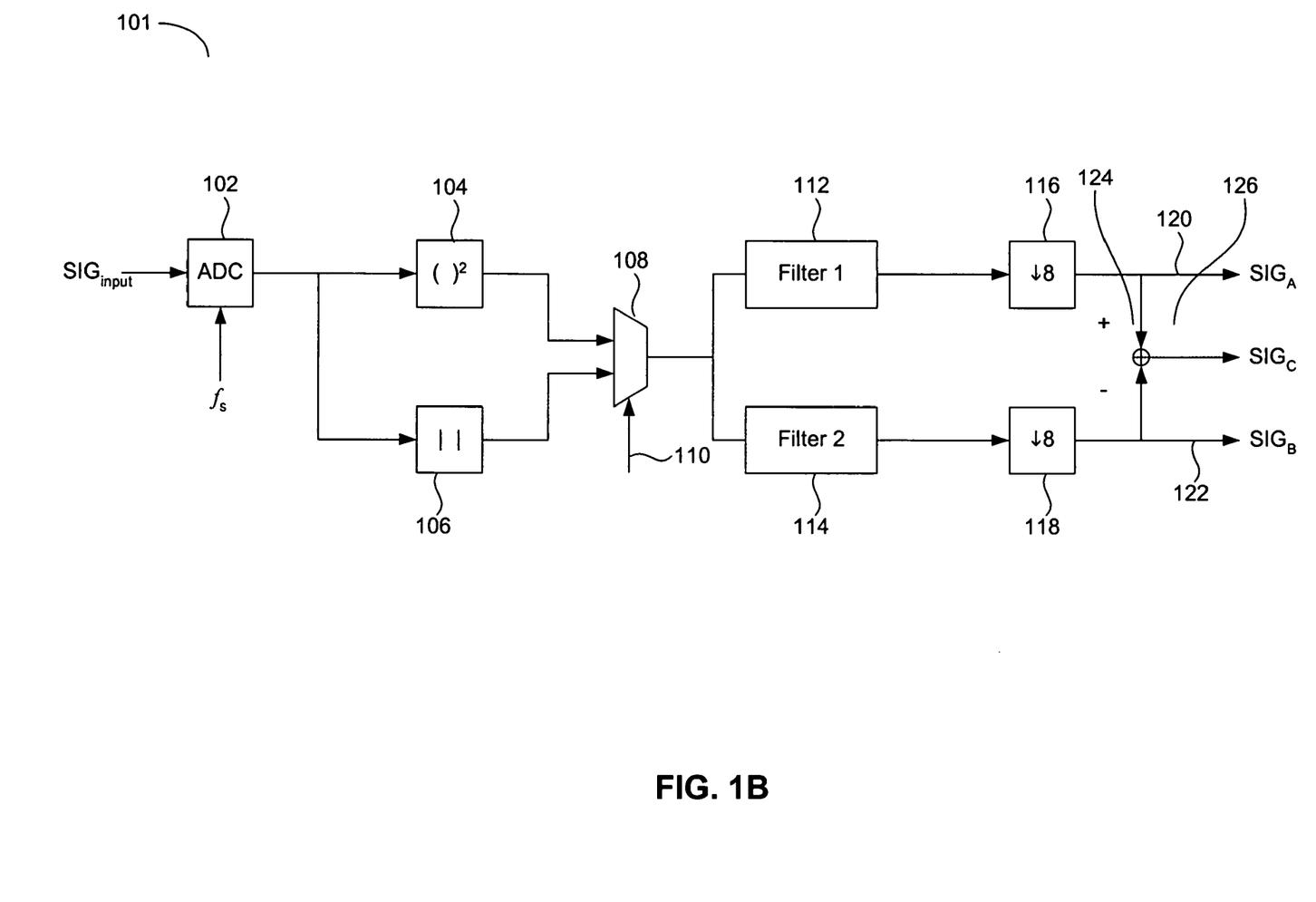
FIG. 1B is a more detailed block diagram of the pre-processing system shown in FIG. 1A.

FIG. 1B is a block diagram of the pre-processing section 101 of the receiving system 100, shown in FIG. 1A. In FIG. 1B, the pre-processing system 101 includes an analog to digital converter (ADC) 102. The ADC 102 is configured to receive an input analog signal $SIG_{input}$ and convert it to digital domain. A source of the input analog signal $SIG_{input}$ could be a radar system that uses pulse width keyed signals. The ADC 102 receives the input analog signal $SIG_{input}$ at one input port and receives a sampling signal (fs) at another input port. The sampling signal (fs) is used to sample the input signal $SIG_{input}$ at a predetermined sampling rate. Although any suitable sampling frequency can be used, the sampling signal (fs) in the present invention has a frequency of about one mega-hertz. A resulting digital signal is then output from the ADC 102.

The digital signal output from the ADC 102 is then converted to power domain within a power converter 104. The power converter 104 converts to power domain by taking the square of signal level data that represents the signal output from the ADC 102. Simultaneously, the output digital signal is converted to an absolute value domain within an absolute value converter 106. Outputs of the power converter 104 and the absolute value converter 106 are provided to a multiplexer 108.

The multiplexer 108, which can be configured via hardware and/or software using an input select switch 110, selects between outputs from the power converter 104 and the absolute value converter 106. Converting the signal to the power domain conversion provides a more reliable signal energy expression and preserves more of the signal's energy than the absolute value domain conversion. The power converter 104, however, is more expensive to implement. The absolute value domain conversion provides slightly inferior signal expression, but is cheaper to implement. As a matter of practice, the multiplexer 108 is typically configured to select the output from the power converter 104, since it is more reliable. The output of the absolute value converter 106 is most serves as a back up (e.g., purposes of verification). The output of the multiplexer 108 is then provided to filters 112 and 114.

The filters 112 and 114 are low pass filters and are provided for estimating signal power. While each of the filters 112 and 114 can be implemented using a number of different architectures, in the embodiment of FIG. 1, the filters 112 and 114 are cascaded integrated comb (CIC) filters. The filter 112 has wide bandwidth properties and the filter 114 has narrow bandwidth properties.

In the present invention, the output of the multiplexer 108 includes digital samples representative of the power domain or the absolute value domain of the input signal $SIG_{input}$. The CIC filters 112 and 114 perform moving average filtering of the digital samples output from the multiplexer 108.

For example, the wide bandwidth CIC filter 112 averages the digital samples using predetermined integration time periods and sample increments. In FIG. 1B, the integrations time period of the CIC filter 112 was programmed to be within a range of 8 to 256 microseconds. A programmable sliding window operation is also used, sliding in exemplary increments of 8 samples. The integration times and sliding increment are programmable. Thus, the present invention is not limited to any particular integration and/or increment value(s).

The narrow bandwidth CIC filter 114 has been programmed to an integration time period of 256 to 512 microseconds, using the same sliding window of 8 sample increments.

As noted above, the filter 112 is implemented as a wide bandwidth filter. As such, its time span is inversely proportional to its bandwidth. The wider the bandwidth of the filter, the shorter (faster) its time span. This concept applies equally to the filter 114, implemented as a narrow bandwidth filter. That is, the more narrow the bandwidth, the longer (slower) its time span.

A shorter time span enables the system 100 to respond more accurately to very rapid changes in the energy level of an input signal. However, an issue with using the wideband filter 112 by itself is that when the signal's energy quickly increases due to the rising edge of a received pulse, a portion of this increased energy may be due to noise. Thus, in a noisy environment, the signal's energy within the wideband (fast response) filter 112 may be constantly going up and down, rapidly increasing and then rapidly decreasing. Therefore, the operation of the wideband filter 112 is complimented by operation of the narrowband (slow response) filter 114.

The narrow band filter 114 is slower to react to changes in a signal's energy and is therefore somewhat more stable. When signal energy is received, the filter 114 reacts gradually and is therefore less susceptible; for example, to noise spikes tend to be of shorter duration. The output of the narrowband filter 114, therefore, is somewhat cleaner than the output of the wideband filter 112.

Thus, as shown in FIG. 1B, the present invention integrates the use of two different bandwidth filters, such as the wide bandwidth filter 112 and the narrow bandwidth filter 114. The use of two different bandwidth filters provides more robust and reliable signal power estimation and, consequently, more accurate pulse width measurements.

Outputs of the wideband filter 112 and the narrowband filter 114 are provided as inputs to optional down samplers 116 and 118, respectively. Down sampling decreases the timing resolution of the output waveforms. The down samplers 116 and 118, however, can be omitted (e.g., for cost savings) without impacting the operation of the present invention. Although a down sampling factor of 8 is illustrated in FIG. 1B, any suitable down sampling factor can be used. Generally, the higher the down sampling factor, the lower the timing resolution of the associated signal.

The wideband filter 112, by way of the optional down sampler 116, forms an output numerical value 120, representative of a quantized waveform $SIG_A$. The narrowband filter 114, by way of the optional down sampler 118, forms an output numerical value 122, representative of a quantized waveform $SIG_B$. A combiner 124 subtracts the numerical values 120 and 122 to form a numerical value 126, which is representative of a quantized waveform $SIG_C$.

Figure 2:
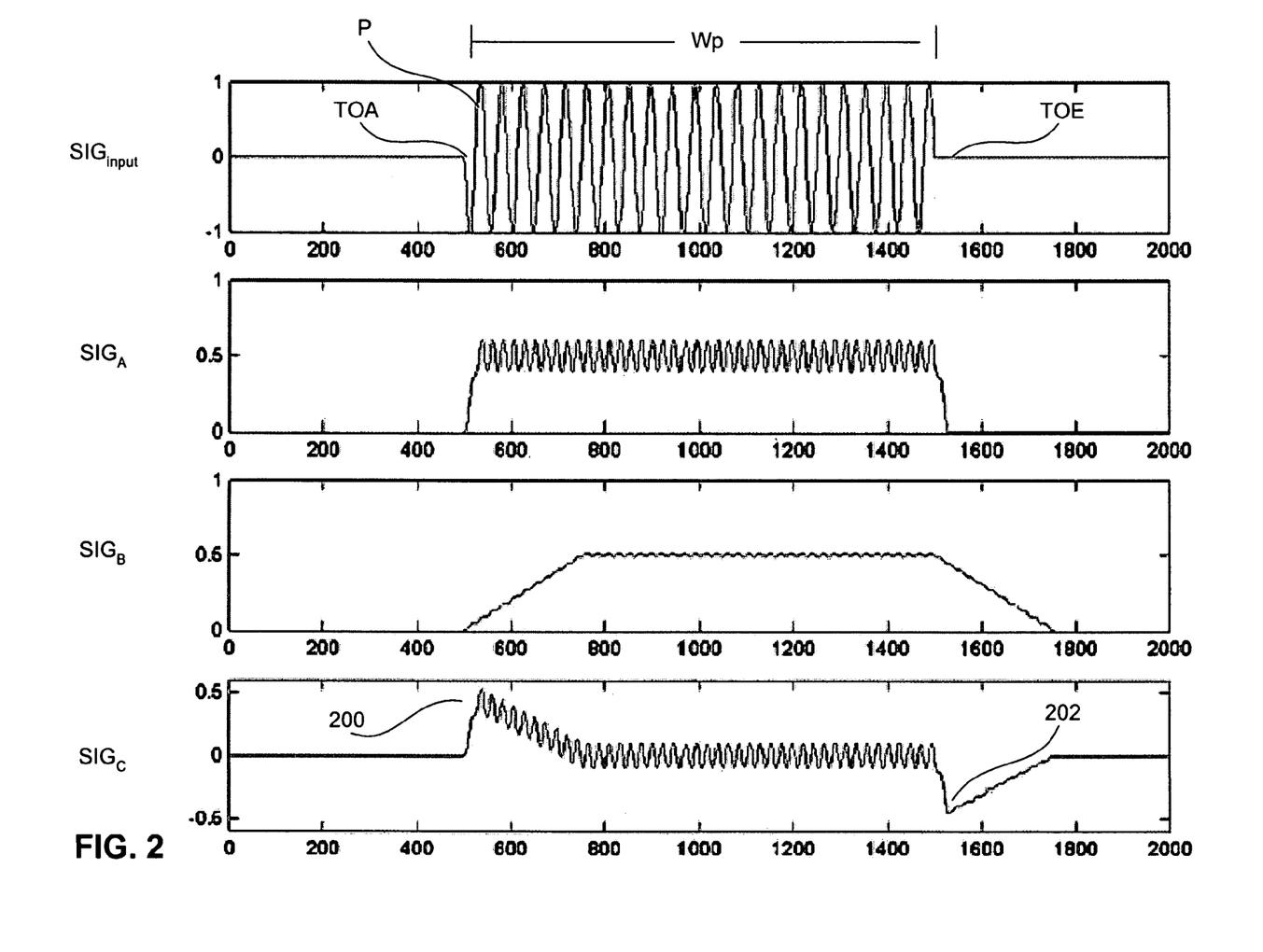
FIG. 2 is a diagram of exemplary signal waveforms outputs from the pre-processing system shown in FIG. 1B.

FIG. 2 provides an illustration of exemplary waveform signal shapes associated with the receiving system 100. For example, FIG. 2 depicts the input signal $SIG_{input}$. The signal $SIG_{input}$ includes a pulse (P) that might be representative, for example, of radar target data (range, rate, etc.). On the other hand, the pulse (P) could be pure noise. Also shown in FIG. 2, are each of the exemplary waveforms $SIG_A$, $SIG_B$, and $SIG_C$. The waveform $SIG_A$ is the output of the wide bandwidth (fast response) filter 112 and resembles a relatively sharp square wave. More specifically, edges of the waveform $SIG_A$ rise and fall relatively quickly. The waveform $SIG_B$, output from the narrow bandwidth (slow response) filter 114, is somewhat similar. However, rising and falling edges of the waveform $SIG_B$ are more gradual than those of the waveform $SIG_A$.

The waveform $SIG_C$ is formed from taking the difference between the waveforms $SIG_A$ and $SIG_B$ within the combiner 124 of FIG. 1B. As shown in FIG. 2, the waveform $SIG_C$ includes a peak 200 and a dip 202. When the signal $SIG_C$ reaches the peak 200, it begins to fall, eventually reaching an amplitude value of zero. The signal $SIG_C$ remains at this zero value until the pulse (P) begins to disappear, forming its falling edge represented by the dip 202.

The pre-processing system 101 receives and processes the input signal $SIG_{input}$. Among other things, the pre-processing system 101 integrates the use of the two different bandwidth filters 112 and 114 to form the waveforms $SIG_A$, $SIG_B$, and $SIG_C$. Each of these waveforms includes its own unique data that can then be used by one or more of the processing systems 130 and 132 to accurately determine pulse related characteristics of the input signal $SIG_{input}$, such as pulse width. For example, as shown in FIG. 2, each of the waveforms $SIG_A$, $SIG_B$, and $SIG_C$ conveys unique rising edge and falling edge information related to the pulse (P). This rising edge and falling edge information is later used as a basis for accurately measuring the width ($W_P$) of the pulse (P).

The waveform $SIG_C$ is provided as an input to the path I processing system 130. The waveforms $SIG_A$ and $SIG_B$ are simultaneously provided as inputs to the path II processing system 132. Although the processing systems 130 and 132 are depicted in FIG. 1A as operating in a complimentary arrangement, each can be used to as a separate and independent technique to determine the pulse width ($W_P$). In the complimentary arrangement, outputs of the processing systems 130 and 132 can be compared and/or averaged to further enhance the reliability and accuracy of pulse width ($W_P$) determinations made by the system 100.

Figure 3:
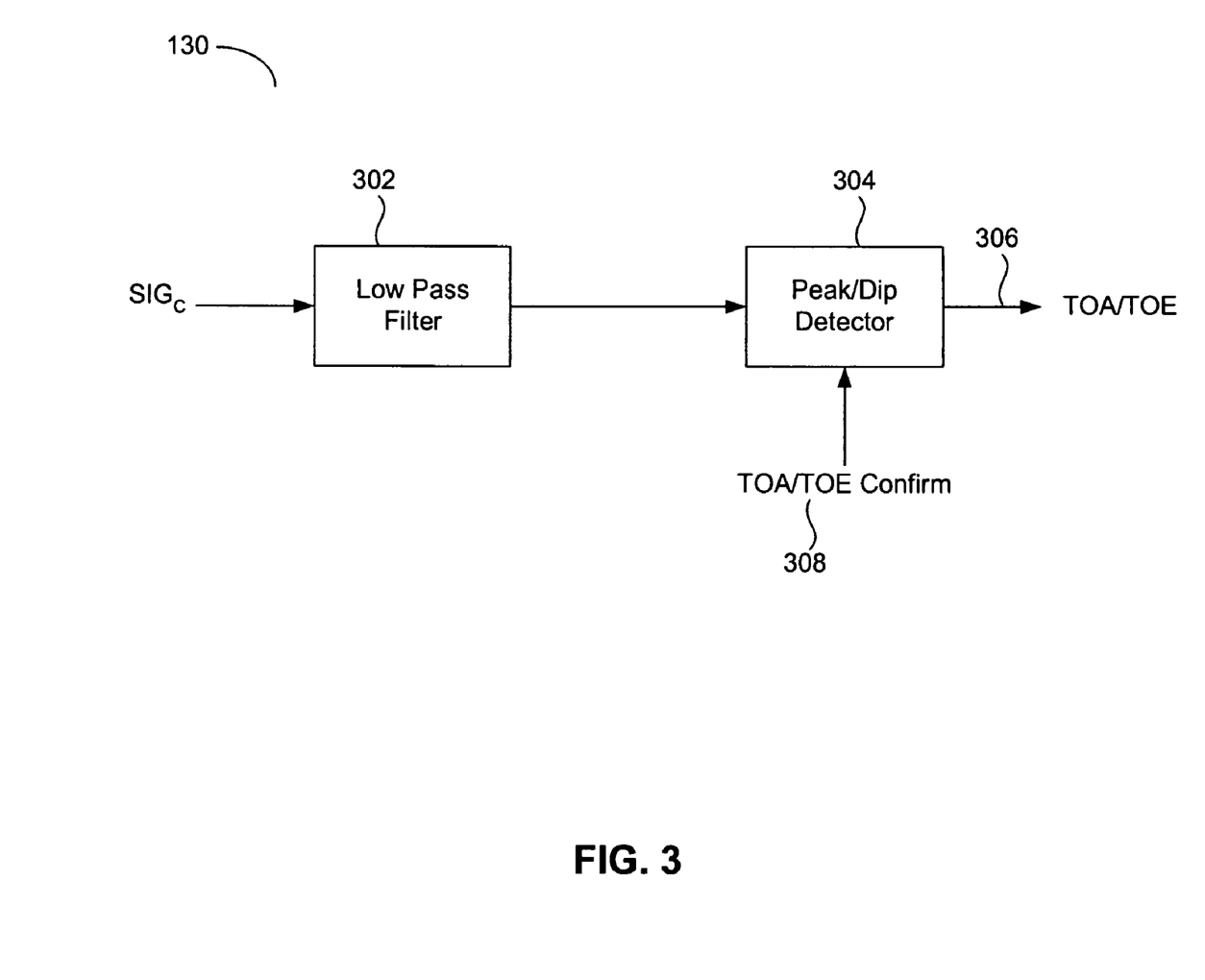
FIG. 3 is a block diagram of the path I processing system shown in FIG. 1A.

As shown in FIG. 3, the path I processing system 130 includes a low pass filter 302 and a peak/dip detector 304. The low pass filter 302 provides one additional level of filtering via a moving average calculation to remove any remaining noise components from the waveform $SIG_C$. In the embodiment of FIG. 3, the low pass filter 302 calculates the moving average in accordance with a well know exponential windowing function $\alpha/[(1+(\alpha-1)z^{-1}]$. The present invention, however, is not limited to this approach. An output of the filter 302 is provided as an input to the peak/dip detector 304.

As illustrated in FIG. 2, the waveform $SIG_C$ includes unique rising edge and falling edge information related to the pulse (P) of the input signal $SIG_{input}$. For example, the peak 200 and the dip 202 are formed within the waveform $SIG_C$ and reliably represent the location of the rising and falling edges of the pulse (P). The peak/dip detector 304 first senses the presence of the peak 200 and the dip 202, it then records the time that the peak 200 occurs, and finally records the time that the dip 202 occurs.

The recorded time of the peak 200 is a first assessment of the system 100 (i.e., based upon the waveform $SIG_C$) of the actual time of arrival (TOA) of the pulse (P). Correspondingly, the recorded time of the dip 202 is a first assessment of the time of ending (TOE) of the pulse (P). The width ($W_P$) of the pulse (P) is represented by a difference between the TOA and the TOE. The width ($W_P$), obtained by analyzing the signal $SIG_C$, is output from the peak/dip detector 304 in the form of a single TOA/TOE value 306.

In FIG. 3, the peak/dip detector 304 includes a state machine, although the present invention is not limited to this approach. Within the peak/dip detector 304, a preliminary TOA/TOE determination is made and is then compared with a TOA/TOE value 308 as a confirmation check. The TOA/TOE value 308 can be provided using the conventional threshold techniques noted above. This comparison results in the TOA/TOE value 306. Simulation results have shown that the techniques of the path I processing system 130 provide significant improvements in the reliability of pulse width measurements in comparison to the conventional threshold techniques noted above.

Figure 4:
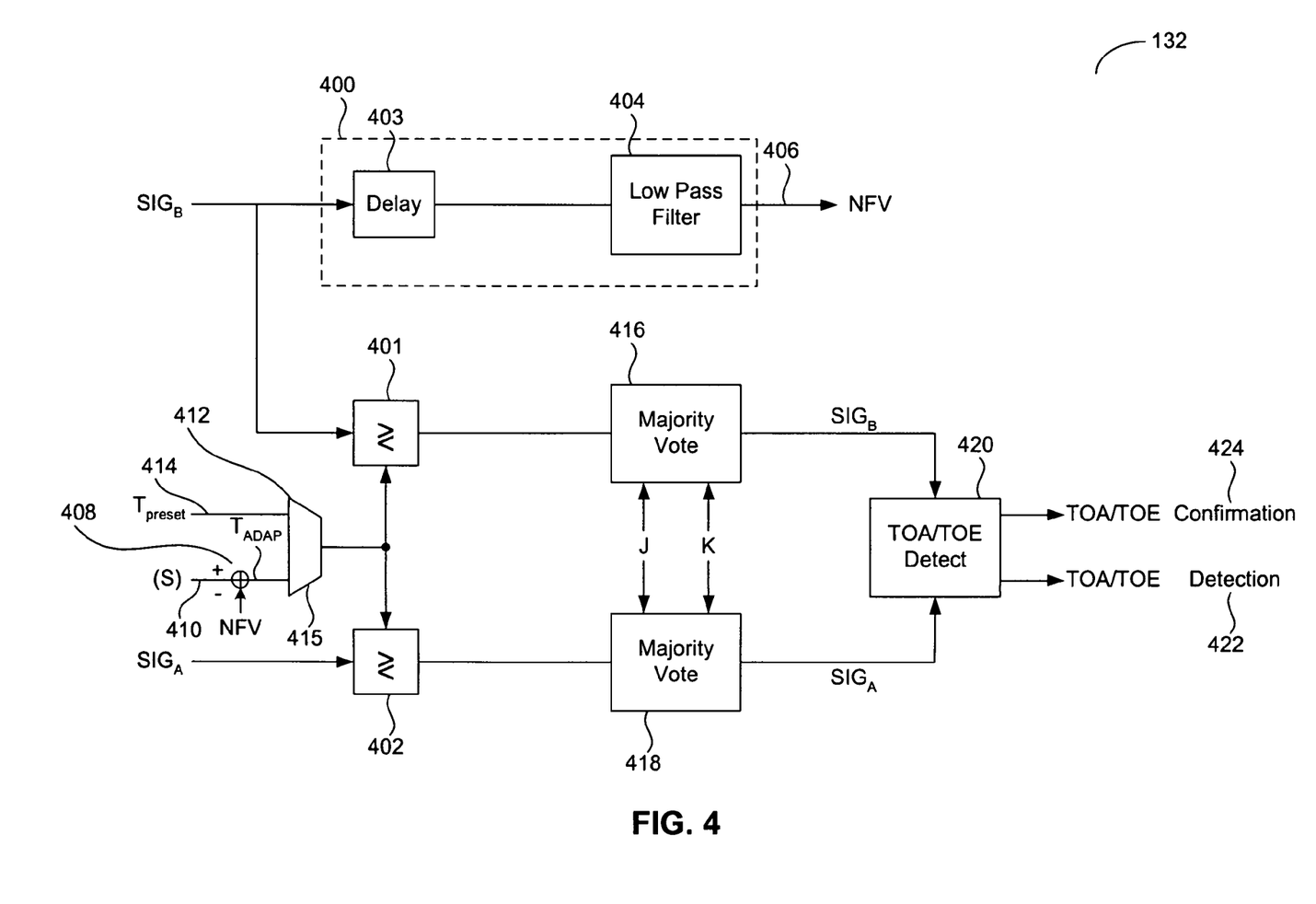
FIG. 4 is a block diagram of the path II processing system shown in FIG. 1A.

FIG. 4 provides a more detailed illustration of the path II processing system 132. As previously discussed, the path II processing system 132 represents an alternative, or complimentary, approach for determining the width ($W_P$) of the pulse (P). In general, the processing system 132 more carefully determines power (S) and noise (N) characteristics of the waveforms $SIG_A$ and $SIG_B$. These power (S) and noise (N) determinations are then used to provide more robust threshold techniques to determine the TOA and TOE of the pulse (P).

In the processing system 132, the waveform $SIG_B$ is simultaneously provided as an input to a noise estimator 400 and a threshold detection circuit 401. Also occurring simultaneously with the inputs of the $SIG_B$, the signal $SIG_A$ is input to a threshold detector 402.

The noise estimator 400 is provided to calculate a noise floor of the signal $SIG_B$, and includes a delay module 403 and a low pass filter 404. The delay module 403 delays the input signal $SIG_B$ in accordance with a well-known inverse delay expression ($Z^{-N}$). The delay of the signal $SIG_B$ provides sufficient time for the system to detect the presence of a pulse and stop the noise floor estimation. A delayed signal $SIG_B$ is then provided as an input to the low pass filter 404. The low pass filter 404 performs a moving average calculation to reliably estimate the noise (N) of the signal $SIG_B$.

By way of background, when the pulse in the signal $SIG_B$ appears at the input to the low pass filter 404, it includes both power (S) and noise (N) components. Thus, the signal $SIG_B$ can be expressed as (S)+(N), where (N) is equivalent the energy amplitude at the input of the filter 404 when there is no signal present. On the other hand, when there is noise only, and the signal $SIG_B$ appears at the input to the low pass filter 404, it includes only the noise (N) component. The noise floor estimation block should be turned on only when there is no pulse presented. The resulting noise (N) component, now updated via the moving average, becomes the noise floor estimate of delayed signal $SIG_B$. The actual output of the noise estimator 400, therefore, is a numerical noise floor value (NFV) 406, representative of the noise floor estimate of the signal $SIG_B$. Though not a requirement of the instant invention, the low pass filter 404 is implemented in the same manner as the low pass filter 302 of FIG. 3.

In the processing system 132 of FIG. 4, the NFV 406 is provided as a first input to a combiner 408, positioned along an input port 410 to a multiplexer 412. The accurate estimate of the power (S) component, refined by the moving average calculation above, is provided as a second input to the combiner 408. The NFV 406 (noise floor estimate) is then subtracted from the power (S) component to form an adaptive threshold value ($T_{ADAP}$) of the signal $SIG_B$.

In the present invention, an operator can also program a preset threshold value ($T_{PRESET}$) using conventional techniques. The preset threshold value ($T_{PRESET}$) is then provided as another input to the multiplexer 412, along an input port 414. As an added programmability feature, the user can configures a switch 415 to select between the adaptive threshold value ($T_{ADAP}$) and the preset threshold value ($T_{PRESET}$). In practice, however, the adaptive threshold value ($T_{ADAP}$) is preferable since it is derived from the actual input signal $SIG_B$.

The selected threshold value ($T_{PRESET}$ or $T_{ADAP}$), output from the multiplexer 412, is provided as additional input to each of the threshold detectors 401 and 402. The selected value represents the threshold trigger of each of the detectors 401 and 402. That is, the input signals $SIG_A$ and $SIG_B$ will only be output from the respective detectors 402 and 401 when their corresponding amplitudes exceed the selected threshold value ($T_{PRESET}$ or $T_{ADAP}$). The threshold detectors 401 and 402, thereby, further reduce the potential of noise (e.g., jitter) in the waveform signals $SIG_A$ and $SIG_B$. Outputs of the threshold detectors 401 and 402 are provided as inputs to respective J out of K majority vote modules 416 and 418.

The waveform signals $SIG_A$ and $SIG_B$ are comprised of quantized samples, as discussed with regard to FIG. 1A above. Therefore, some of the signal samples will exceed the threshold value of their respective detection circuits 401 and 402, and some will not. Of the signal samples that exceed the detection threshold value and are provided as inputs to the respective majority vote modules 416 and 418, some may still be purely noise.

The majority vote modules 416 and 418 are therefore provided to further filter and smooth pulses in the waveforms $SIG_A$ and $SIG_B$. The pulse (P) represents, shown in FIG. 2, is an exemplary depiction of one of these pulses. The smoothing provided by the voting modules 416 and 418 ultimately further enhance the reliability of eventual pulse width measurements. Majority voting modules are well understood by those of skill in the art.

For purpose of review, however, majority voting entails the use of a sliding window having a predetermined width (e.g., K number of samples). In the present invention, this sliding window is used to compare K samples from one signal (e.g., $SIG_A$) with corresponding samples from another signal (e.g., $SIG_B$). The sliding window begins, for example, with each of the first K samples from the signal $SIG_A$ compared with a corresponding (twin) sample from the signal $SIG_B$. Since the window slides through the entire signal one pulse at a time (or some other programmable value), each sample within the window is compared with its twin K times. Out of these K comparisons between twins (corresponding pulse), the twins must match (match based upon user determined classifiers) J out of the K comparisons.

In the majority vote modules 416 and 418 of FIG. 4, for example, the respective output samples will form relatively clean (e.g., square wave) pulses that have maintained fairly sharp rising and falling edges, despite the presence of noise. The clean (square wave) pulses can then be used for detection and measurement of their pulse widths (i.e., TOA/TOE difference). Outputs of the majority vote modules 416 and 418 are provided as inputs to a TOA/TOE detection module 420. The TOA/TOE detection module 420 senses and then records the TOA and TOE of the pulses associated with the signals $SIG_A$ and $SIG_B$.

Referring back to FIG. 2 and discussed above, the rising and falling edges of the signal $SIG_A$ occur quickly and are therefore good determinants for accurately measuring the TOA and the TOE. However, since the waveform signal $SIG_A$ is faster, it is also more susceptible to noise. Thus, although the samples of the waveform signal $SIG_A$ are more accurate with respect to time, there is a lower confidence that these samples represent a valid pulse. That is, these samples could still be noise.

On the other hand, the rising and falling edges of the waveform signal $SIG_B$ occur gradually and more slowly than those of the signal $SIG_A$. Correspondingly, the waveform signal $SIG_B$ is less susceptible to noise than the waveform signal $SIG_A$. Thus, when waveform samples associated with the signal $SIG_B$ exceed the threshold of the detector 401, there greater confidence that an actual signal pulse is present.

For these reasons, the TOA/TOE detector 420 relies on the waveform signal $SIG_A$ for actual TOA/TOE detection 422 (i.e., recording of the TOA/TOE numerical values) since it is faster. Once the TOA/TOE numerical values (derived from the signal $SIG_A$) are recorded, the detector 420 then uses the TOA/TOE of the signal $SIG_B$ for purpose of confirmation 424. That is, the detector 420 relies on the TOA/TOE values of the signal $SIG_B$ to confirm that the recorded TOA/TOE values for the signal $SIG_A$ represent an actual pulse and not noise.

The receiving system 100 can be configured to provide TOA/TOE measurements in a number of different ways, based upon user requirements/preferences. For example, the TOA/TOE value 422, output from the detector 420, can be used as an independent measurement of the width ($W_P$) of the exemplary pulse (P). Similarly, the TOA/TOE value 306, output from the peak/dip detector 304, can also be used as an independent measurement of the width ($W_P$) of the pulse (P). In yet another more complimentary configuration, the TOA/TOE detection values 422 and 306 can be averaged together, or compared, to produce an even more robust and reliable measurement of the width ($W_P$) of the pulse (P).

Figure 5:
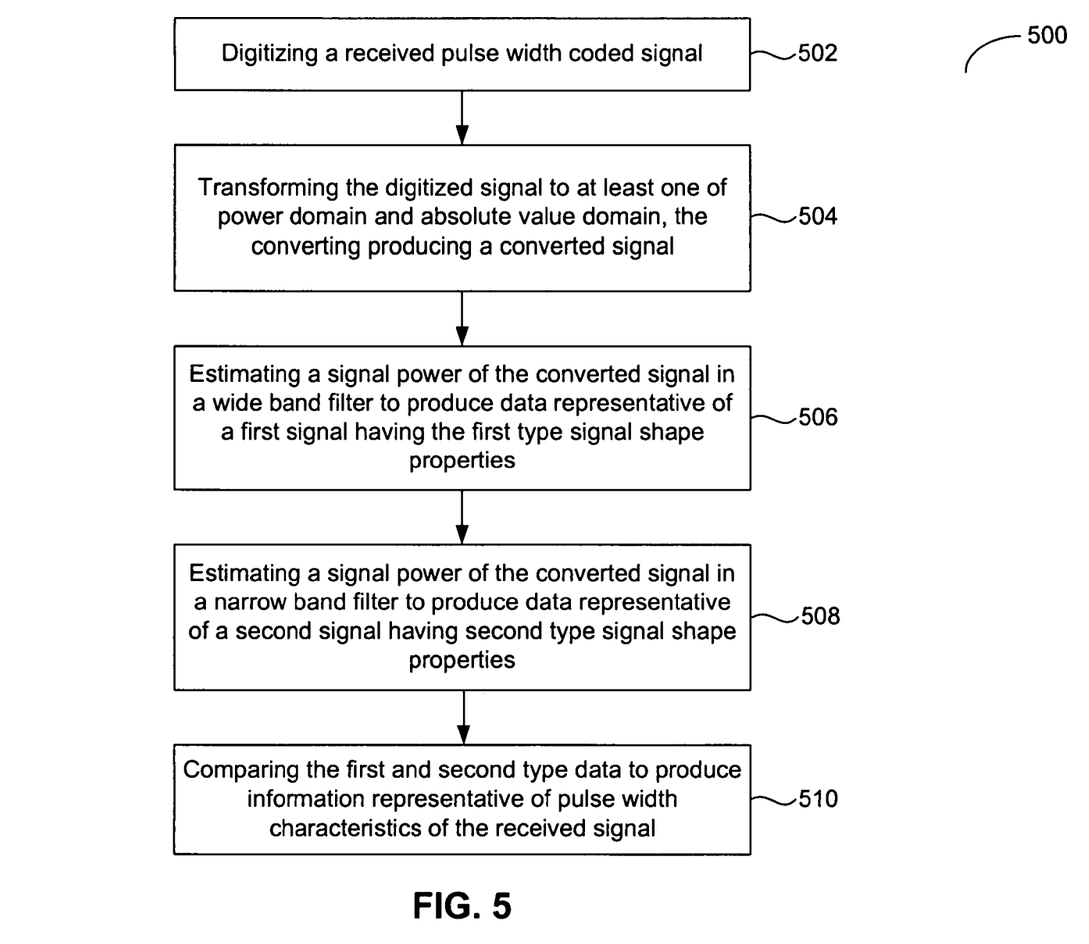
FIG. 5 is a flow diagram of an exemplary method of practicing an embodiment of the present invention.

FIG. 5 is an exemplary method 500 of practicing an embodiment of the present invention. In FIG. 5, a received pulse width coded signal is digitized, as indicated in step 502. In step 504, the digitized signal is transformed to at least one of power domain and absolute value domain to produce a converted signal. In steps 506 and 508, a signal power of the converted signal is estimated using (i) a wide band filter to produce data representative of a first signal having first type signal shape properties and (ii) a narrow band filter to produce data representative of a second signal having second type signal shape properties. The first and second signal data are then compared to produce information representative of pulse width characteristics of the received signal, as shown in step 510.

CONCLUSION

The present invention provides a new receiver architecture that uses power detection for robust and accurate pulse width measurements in the presence of noise. A pre-processing system provides an initial level of analysis of signal spectral data to be used for measurements. The analyzed data is then provided to two independent processing systems, each using a unique technique to measure, for example, a signal's pulse width. Based upon user preferences, the two systems can be used separately or in complimentary fashion to provide significantly more reliable measurements of pulse width.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method to process a pulse width coded signal, comprising:
   digitizing a received pulse width coded signal;
   transforming the digitized signal to at least one of power domain and absolute value domain, the transforming producing a converted signal;
   estimating a signal power of the converted signal in a wide band filter to produce data representative of a first signal having first type signal shape properties;
   estimating a signal power of the converted signal in a narrow band filter to produce data representative of a second signal having second type signal shape properties; and
   comparing the first and second signal data to produce information representative of pulse width characteristics of the received signal.

2. The method of claim 1, further comprising down sampling each of the first and second type data prior to the comparing.

3. The method of claim 2, wherein the down sampling includes down sampling from within a range of between eight and a value less than a sampling increment associated with each of the estimating steps.

4. The method of claim 1, wherein each of the estimating steps includes performing moving average filtering.

5. The method of claim 4, wherein the moving average filtering includes averaging converted signal data in increments of eight.

6. The method of claim 5, wherein the wideband estimating includes filtering the converted signal in time periods within a range of about 8 to 256 microseconds; and
   wherein the narrowband estimating includes filtering the converted signal at in time periods within a range of about 256 to 512 microseconds.

7. An apparatus, comprising:
   an analog to digital converter (ADC) configured to receive an analog input signal;
   a power converter configured to receive a signal output from the ADC;
   an absolute value converter configured to receive a signal output from the ADC;
   a multiplexer configured to select an output from one of the power converter and the absolute value converter;
   a first filter configured perform a first time period integration on a signal output form the multiplexing device; and
   a second filter configured to perform a second time period integration on the signal output from the multiplexing device.

8. The apparatus of claim 7, further comprising respective down sampling devices configured to receive output from the first and second filter.

9. The apparatus of claim 8, wherein the respective down sampling devices are configured to produce first and second type waveform data.

10. The apparatus of claim 9, further comprising a combiner configured to combine outputs of the respective down sampling devices.

11. The apparatus of claim 10, wherein the combiner is configured to produce third type waveform data.

12. The apparatus of claim 11, further comprising a threshold circuit to determine thresholds associated with the first, second, and third type waveform data.

13. The apparatus of claim 12, wherein the threshold circuit produces first and second time of arrival data (TOA);
   wherein the first TOA data is used to determine a TOA associated with the input analog signal; and
   wherein the second TOA data is used to confirm the determined TOA.

14. An apparatus to process to process a pulse width coded signal, comprising:
   means for digitizing a received pulse width coded signal;
   means for transforming the digitized signal to at least one of power domain and absolute value domain, the transforming producing a converted signal;
   means for estimating a signal power of the converted signal in a wide band filter to produce data representative of a first signal having first type signal shape properties;
   means for estimating a signal power of the converted signal in a narrow band filter to produce data representative of a second signal having second type signal shape properties; and
   means for comparing the first and second type data to produce information representative of pulse width characteristics of the received signal.

15. The apparatus of claim 14, further comprising means for down sampling each of the first and second type data prior to the comparing.

16. The method of claim 15, wherein the means for down sampling includes down sampling from within a range of between eight and a value less than a sampling increment associated with each of the estimating steps.

17. The method of claim 16, wherein each of the means for estimating includes means for performing moving average filtering.

* * * * *